United States Patent [19]
Byrnes et al.

[11] Patent Number: 5,810,562
[45] Date of Patent: Sep. 22, 1998

[54] COMPOSITE ROTATING SWASHPLATE FOR A HELICOPTER ROTOR SYSTEM

[75] Inventors: Francis Edward Byrnes, White Plains, N.Y.; Robert James Milne, Litchfield, Conn.

[73] Assignee: Sikorsky Aircraft Corporation, Stratford, Conn.

[21] Appl. No.: 719,292

[22] Filed: Sep. 17, 1996

[51] Int. Cl.⁶ .................................................. F04D 29/36
[52] U.S. Cl. ........................................ 416/114; 416/134 A
[58] Field of Search .................................. 416/114, 115, 416/134 A, 230 A, 244

[56] References Cited

U.S. PATENT DOCUMENTS

| | | | |
|---|---|---|---|
| 4,804,315 | 2/1989 | Ferris et al. | 416/114 |
| 5,067,875 | 11/1991 | Hunter et al. | 416/114 |
| 5,074,494 | 12/1991 | Doolin et al. | 416/114 |
| 5,083,725 | 1/1992 | Byrnes et al. | 416/114 |
| 5,199,849 | 4/1993 | Leman | 416/114 |

*Primary Examiner*—John T. Kwon
*Attorney, Agent, or Firm*—Seidel Gonda Lavorgna & Monaco, PC

[57] ABSTRACT

A composite rotating swashplate for a helicopter rotor system which includes rotor blades with associated control rods. The control rods control the pitch of the rotor blades. The composite rotating swashplate according to the present invention includes an outer tubular ring with an inner tubular ring located within the outer ring. The outer ring is made from braids of tri-axial graphite fibers interwoven with unidirectional plies. The inner tubular ring is made from braided ±45 degree graphite fibers. A support ring is located within the outer ring and external to an inboard periphery of the inner tubular ring. A plurality of apertures are formed through the outer and inner rings. The apertures are adapted to receive the terminal ends of the control rods. Mounting bolts extend through at least one wall of the outer and inner rings and attach the terminal ends of the control rods to the swashplate.

22 Claims, 12 Drawing Sheets

| Ply# | Type | Perim. | THK (IN) | TOT THK |
|---|---|---|---|---|
| 28 | 0/45 TRI-AXIAL BRAID | 11.273 | 0.0182 | 0.018 |
| 27 | 90 IM7-6K UDF 95-5 | 11.159 | 0.0062 | 0.024 |
| 26 | 0/45 TRI-AXIAL BRAID | 11.273 | 0.0184 | 0.043 |
| 25 | 90 IM7-6K UDF 95-5 | 11.004 | 0.0062 | 0.049 |
| 24 | 0/45 TRI-AXIAL BRAID | 11.273 | 0.0187 | 0.068 |
| 23 | 90 IM7-6K UDF 95-5 | 10.847 | 0.0062 | 0.074 |
| 22 | 0/45 TRI-AXIAL BRAID | 11.273 | 0.0190 | 0.093 |
| 21 | 90 IM7-6K UDF 95-5 | 10.689 | 0.0062 | 0.099 |
| 20 | 0/45 TRI-AXIAL BRAID | 11.273 | 0.0193 | 0.118 |
| 19 | 90 IM7-6K UDF 95-5 | 10.529 | 0.0062 | 0.125 |
| 18 | +/-45 Braid | 9.490 | 0.0147 | 0.139 |
| 13 | +/-45 Braid | 9.398 | 0.0146 | 0.154 |
| 6 | +/-45 Braid | 9.306 | 0.0146 | 0.168 |
| 1 | +/-45 Braid | 9.215 | 0.0146 | 0.183 |

FIG. 10

| Ply# | Type | Perim. | THK (IN) | TOT THK |
|---|---|---|---|---|
| 28 | 0/45 TRI-AXIAL BRAID | 11.273 | 0.0182 | 0.018 |
| 27 | 90 IM7-6K UDF 95-5 | 11.159 | 0.0062 | 0.024 |
| 26 | 0/45 TRI-AXIAL BRAID | 11.120 | 0.0184 | 0.043 |
| 25 | 90 IM7-6K UDF 95-5 | 11.004 | 0.0062 | 0.049 |
| 24 | 0/45 TRI-AXIAL BRAID | 10.965 | 0.0187 | 0.068 |
| 23 | 90 IM7-6K UDF 95-5 | 10.847 | 0.0062 | 0.074 |
| 22 | 0/45 TRI-AXIAL BRAID | 10.808 | 0.0190 | 0.093 |
| 21 | 90 IM7-6K UDF 95-5 | 10.689 | 0.0062 | 0.099 |
| 20 | 0/45 TRI-AXIAL BRAID | 10.650 | 0.0193 | 0.118 |
| 19 | 90 IM7-6K UDF 95-5 | 10.529 | 0.0062 | 0.125 |
| 18 | +/-45 Braid | 9.490 | 0.0147 | 0.139 |
| 17 | 0/90 IM7-6K 8HS | 9.398 | 0.0146 | 0.154 |
| 16 | +/-45 IM7-6K 8HS | 9.306 | 0.0146 | 0.168 |
| 15 | 0/90 IM7-6K 8HS | 9.215 | 0.0146 | 0.183 |
| 14 | +/-45 IM7-6K 8HS | 9.124 | 0.0146 | 0.198 |
| 13 | +/-45 Braid | 9.032 | 0.0154 | 0.213 |
| 12 | 0/90 IM7-6K 8HS | 8.935 | 0.0146 | 0.228 |
| 11 | +/-45 IM7-6K 8HS | 8.844 | 0.0146 | 0.242 |
| 10 | 0/90 IM7-6K 8HS | 8.752 | 0.0146 | 0.257 |
| 9 | +/-45 IM7-6K 8HS | 8.661 | 0.0146 | 0.271 |
| 8 | 0/90 IM7-6K 8HS | 8.569 | 0.0146 | 0.286 |
| 7 | +/-45 IM7-6K 8HS | 8.478 | 0.0146 | 0.300 |
| 6 | +/-45 Braid | 8.387 | 0.0166 | 0.317 |
| 5 | 0/90 IM7-6K 8HS | 8.282 | 0.0146 | 0.331 |
| 4 | +/-45 IM7-6K 8HS | 8.191 | 0.0146 | 0.346 |
| 3 | 0/90 IM7-6K 8HS | 8.099 | 0.0146 | 0.361 |
| 2 | +/-45 IM7-6K 8HS | 8.008 | 0.0146 | 0.375 |
| 1 | +/-45 BRAID | 7.916 | 0.0176 | 0.393 |

FIG. 11

COMPOSITE ROTATING SWASHPLATE FOR A HELICOPTER ROTOR SYSTEM

FIELD OF THE INVENTION

The present invention relates to a composite rotating swashplate for use in a main rotor assembly in a helicopter. The swashplate is designed as a two cell toroidal structure to facilitate load transfer.

BACKGROUND OF THE INVENTION

A helicopter swashplate provides critical control over the rotor blades in a helicopter rotor system. The swashplate transfers control loads to each individual blade during rotation so as to provide the requisite directional control of the overall aircraft. For example, in order for the aircraft to rise vertically, each blade must be pitched about its longitudinal axis to generate lift. Other aircraft maneuvers require varying degrees of rotor blade pitch which may change as the blade rotates about the rotor hub. The swashplate, in combination with servos, control rods, and scissors, permit highly precise control over the pitch of the blades and, accordingly, the resulting direction of flight of the aircraft.

The loads applied to the swashplate during normal operation include shear, bending, and torsional loads. To accommodate these loads, swashplates have traditionally been constructed from metallic materials, such as steel, aluminum, and titanium which provide high strength. However, a swashplate made from these materials adds considerable weight to the rotor system.

New generation helicopters are being designed and developed so as to be faster, more versatile, and more efficient than their earlier counterparts. Composite materials have played a strong part in the design of these new aircraft. However, a variety of components, because of their design configurations and loading, are not easily and cost efficiently capable of being produced from composites.

For example, as shown in FIGS. 1 and 2, a conventional helicopter swashplate consists of metal stationary ring-shaped swashplate attached to the rotor mast. A metallic ring-shaped rotating swashplate is positioned around the outer lateral edge of the stationary swashplate. The rotating swashplate rotates about the stationary swashplate. Apart from rotary motion, the stationary and rotating swashplate otherwise move as a unitary component. Control rods mounted to the main rotor blades are connected to external lugs formed on the rotating swashplate and operate to transfer loads between the swashplate and the main rotor blades. Rotating scissors are mounted between the rotating swashplate and the rotor head. The rotating scissors transfer rotary motion from the rotor shaft to the rotating swashplate while permitting vertical and tilting of the rotating swashplate with respect to the rotor blades. Stationary scissors are mounted between the stationary swashplate and the rotor mast. The stationary scissors are designed to prevent the stationary swashplate from rotating while permitting it to move vertically and to tilt about a ball joint. Main rotor servos extend between and attach to the stationary swashplate and the aircraft fuselage. Displacement of the servos results in corresponding vertical displacement of the servo attachment point on the stationary swashplate. Hence, by actuating selected servos, collective and cyclic commands are transferred to the rotor head as vertical and/or tilting displacement of the stationary and rotating swashplates.

The types and degrees of loading applied to the swashplate necessitate the use of high strength materials, such as metallic materials. While aluminum and titanium materials provide a lightweight and strong component, there are some drawbacks. For example, aluminum material is highly corrosive in a salt water environment, such as on an aircraft carrier. Corrosion of the aluminum could lead to the development of cracks which can reduce the useful life of the component. Titanium, while more corrosion resistant than aluminum, is extremely expensive and weighs considerably more than aluminum. Both aluminum and titanium are also difficult to machine to the degree of precision required for a swashplate.

One prior art rotating swashplate design which utilizes composite material is disclosed in U.S. Pat. No. 4,804,315 to Ferris et al. The swashplate includes a composite spacer ring with a foam core. Precured composite inserts are located at the control rod and scissor attachment points. A tri-axial composite braid is formed around the assembly resulting in an enclosed cellular structure.

While the composite swashplate disclosed in U.S. Pat. No. 4,804,315 provides sufficient strength to withstand the applied rotor loads, the design requires multiple manufacturing steps and, therefore, is relatively costly to produce. Also, precured composite inserts must be bonded in place. Due to the importance of the structure, the bond lines would be considered "flight critical" requiring added safety inspections. Bonded precured components also typically result in a structure with lower strength and manufacturing variations than a single or co-cured structure.

A need therefore exists for a high strength lightweight composite rotating swashplate design which is relatively inexpensive to produce. A need also exists for a rotating swashplate structure that is impervious to salt sea environments.

SUMMARY OF THE INVENTION

The present invention is directed to a composite rotating swashplate for a helicopter rotor system. The rotor system includes rotor blades with associated control rods. The control rods control the pitch of the rotor blades. The composite rotating swashplate according to the present invention includes an outer tubular ring with an inner tubular ring located within the outer ring. The outer ring is made from braids of tri-axial graphite fibers interwoven with unidirectional plies. The inner tubular ring is made from braided ±45 degree graphite fibers.

A support ring is located within the outer ring and external to an inboard periphery of the inner tubular ring. A plurality of apertures are formed through the outer and inner rings. The apertures are adapted to receive the terminal ends of the control rods. Mounting bolts extend through at least one wall of the outer and inner rings and attach the terminal ends of the control rods to the swashplate.

In one embodiment, there is a braid of fiberglass material overwrapping the outer ring to form a durable outer surface. The inner ring if formed from four braided plies of graphite fibers. Interwoven between each ply in the inner ring at the control rod attachment points is a ply pack of quasi-isotropic composite material. A mounting block is also located at the control rod attachment points within the secondary tubular member.

The support ring is preferably made from chopped graphite fibers in an epoxy resin matrix and has a plurality of projections extending radially outwardly from the periphery of the support ring.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 10 is a ply lay-up table for one preferred embodiment of the invention at a location between control rod attachment points.

FIG. 11 is a ply lay-up table for one preferred embodiment of the invention at a control rod attachment point.

DETAILED DESCRIPTION OF THE PREFERRED EMBODIMENTS

Figure 1:
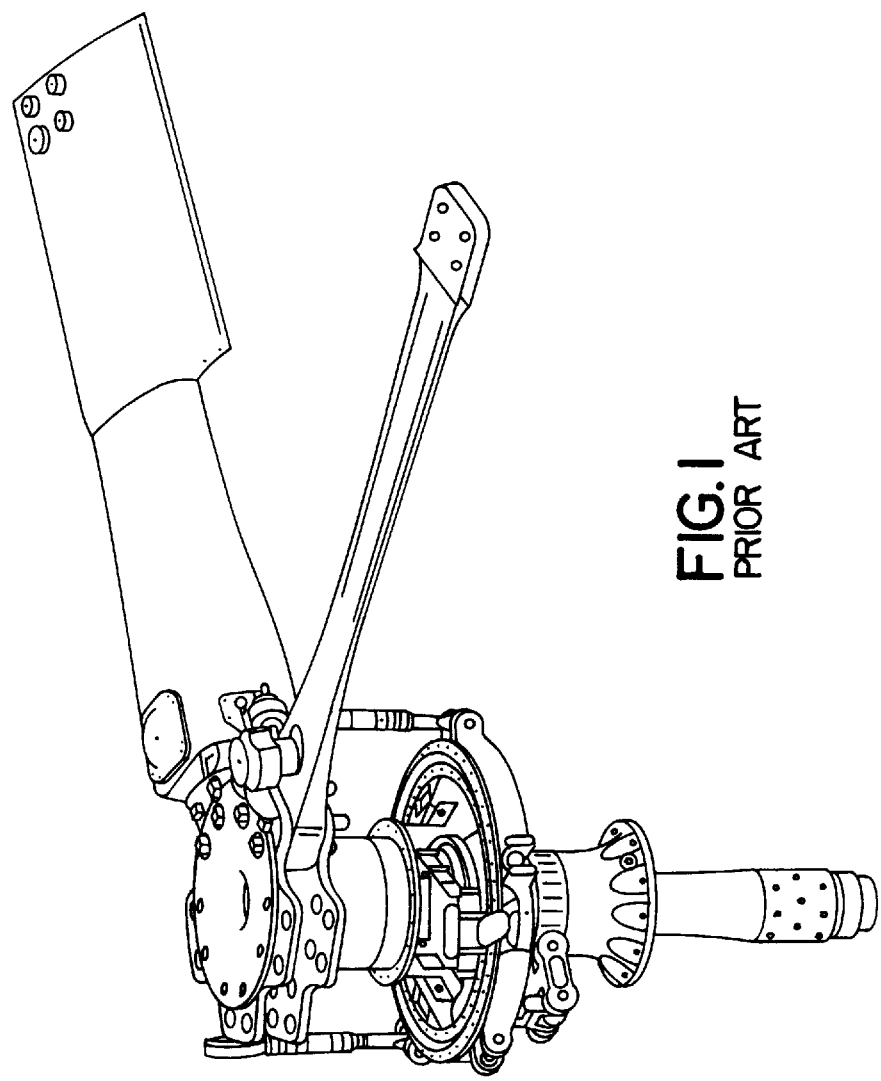
FIG. 1 illustrates a prior art helicopter rotor system which includes a conventional metallic rotating swashplate.
Figure 2:
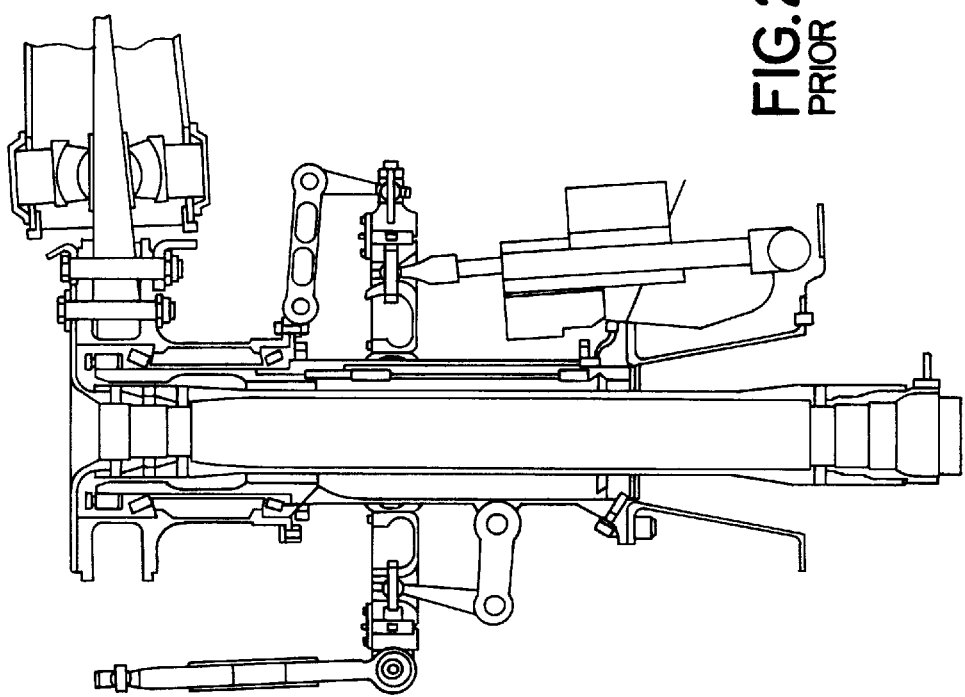
FIG. 2 illustrates a cross-sectional side view of a prior art helicopter rotor system with a metallic rotating swashplate.
Figure 3:
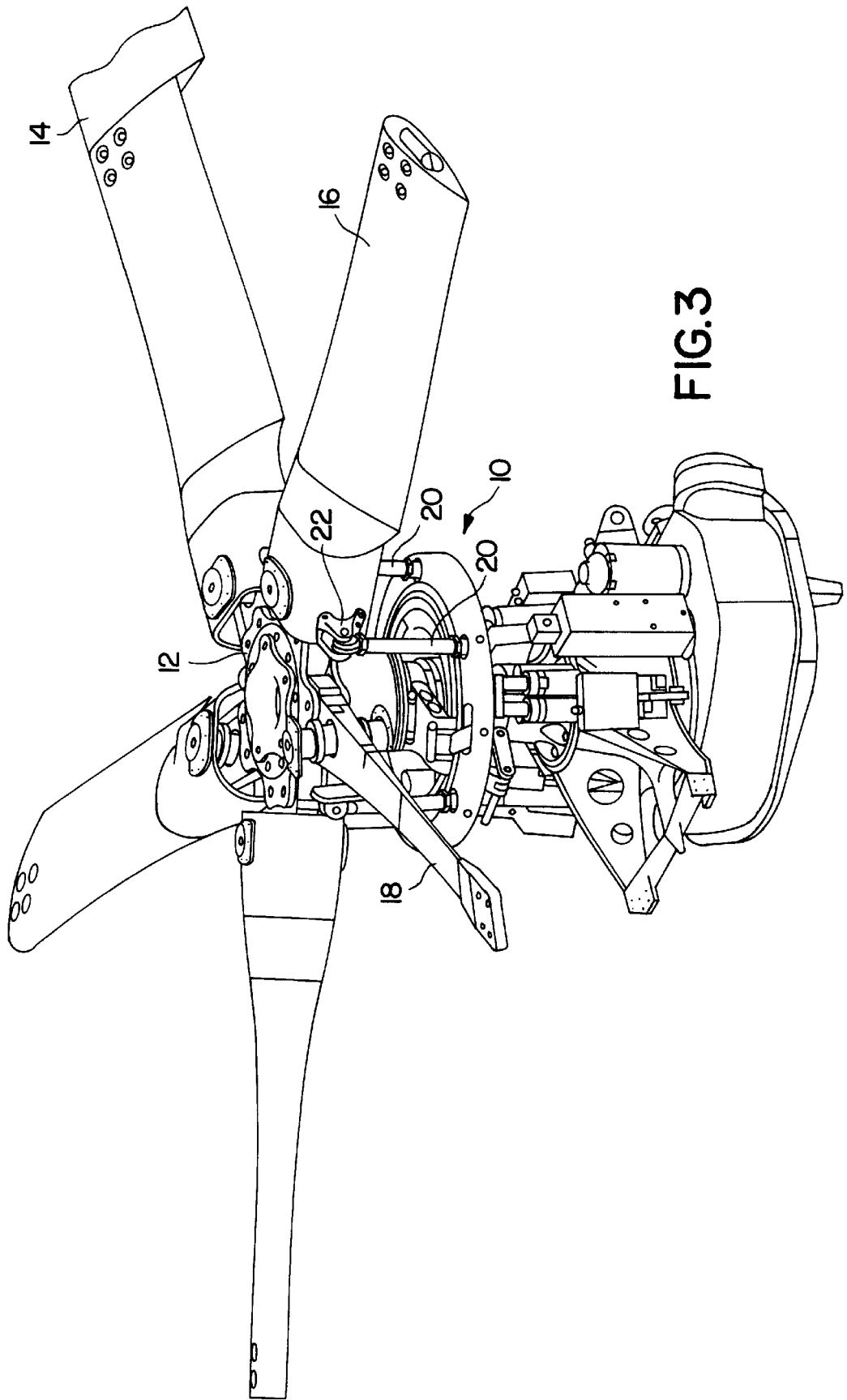
FIG. 3 illustrates a helicopter rotor assembly incorporating a composite rotating swashplate according to the present invention.

Referring now to the drawings, wherein like numerals identify corresponding or similar elements throughout the several views, there is shown in FIG. 3 an embodiment of the present invention as it is incorporated in a swashplate assembly (generally designated by the numeral 10) in a main rotor system of a helicopter. The main rotor system includes a hub 12 with a plurality of rotor blades 14 attached to the hub 12. In the illustrated rotor system, the rotor blades 14 include a torque tube 16 surrounding a flexbeam 18. The invention is not, however, limited to any specific type of rotor blade or rotor system configuration. Main rotor systems for helicopters are well known in the art. Therefore, for the sake of brevity, a detailed discussion of the main rotor system will not be provided. Only the details of the main rotor system that pertain to the claimed invention will be described below.

The overall direction of flight of the helicopter (not shown) is controlled by the pitch (angular orientation) of the rotor blades 14 with respect to their longitudinal or feathering axis. As is conventional in the art, control rods 20 are attached to each torque tube 16 to control the pitch of the torque tube 16 (and rotor blade 14) about the feathering axis. In the illustrated embodiment, which is of a rotor head for an RAH-66A Comanche aircraft, the control rod 20 is connected to a horn 22 which is, in turn, mounted to the torque tube 16. Vertical displacement of the control rod results in a corresponding rotation of the rotor blade about its feathering axis.

The swashplate assembly 10 is disposed around a main rotor shaft which supports the hub 12. As will be discussed in more detail below, the control rods 20 are attached to the swashplate assembly 10 such that vertical motion of the swashplate assembly 10 produces corresponding motion of the control rods 20 and the rotor blades 14.

Figure 4:
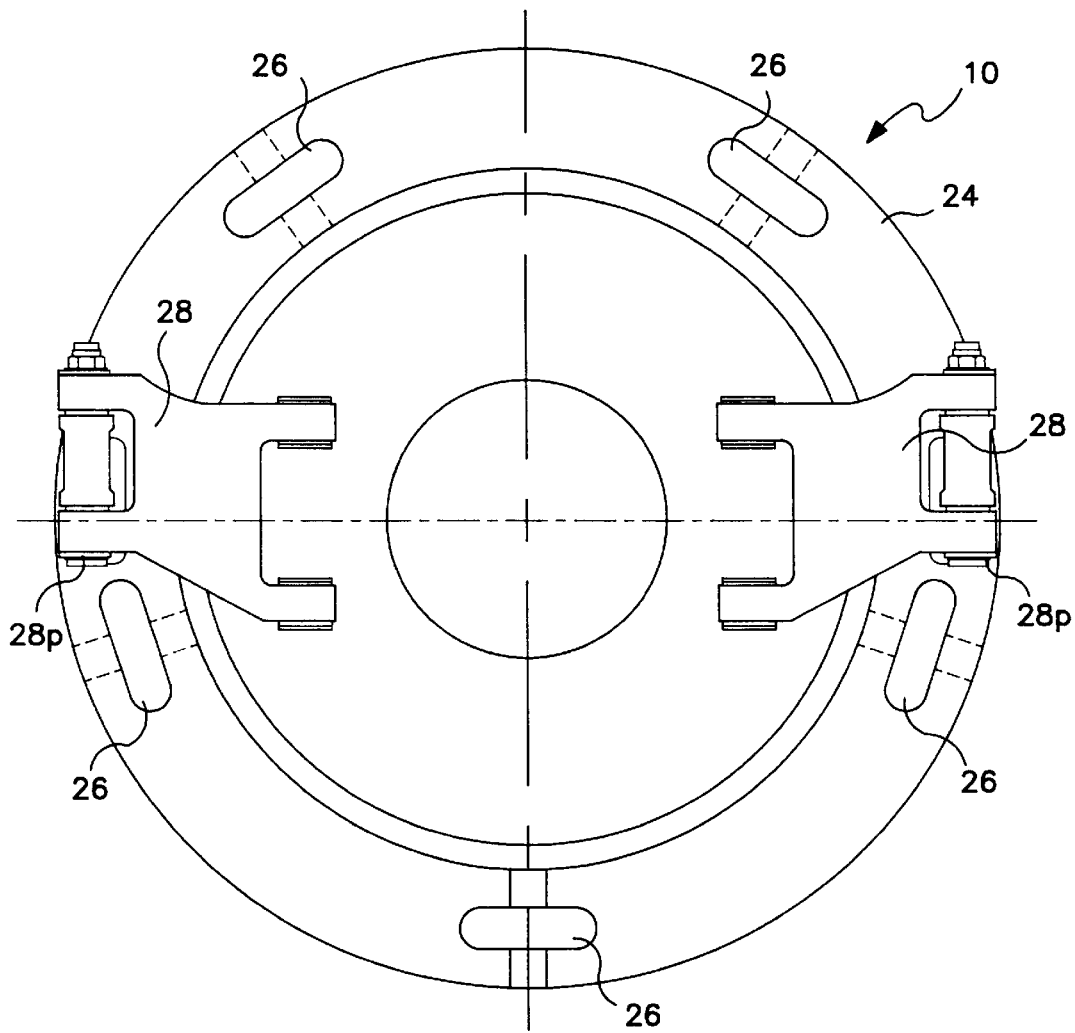
FIG. 4 is a top view of a composite rotating swashplate according to the present invention.

Referring to FIG. 4, a top view of a portion of the swashplate assembly 10 is shown. As will be discussed in more detail below, the swashplate assembly 10 includes a stationary swashplate and a rotating swashplate. FIG. 4 illustrates the rotating swashplate 24. The rotating swashplate 24 is preferably formed in the shape of an annular or toroidal ring. Slotted apertures 26 are formed in the rotating swashplate 24 at prescribed locations. Although not shown in FIG. 4, the slotted apertures 26 are sized to accept the mounting end of the control rods 20. In one preferred embodiment, there are five slotted apertures 26 equally spaced around the rotating swashplate 24. Preferably the spacing and location of the slotted apertures 26 in the rotating swashplate 24 correspond approximately with the spacing and location of the horns 22 on the rotor blades 14.

Figure 5:
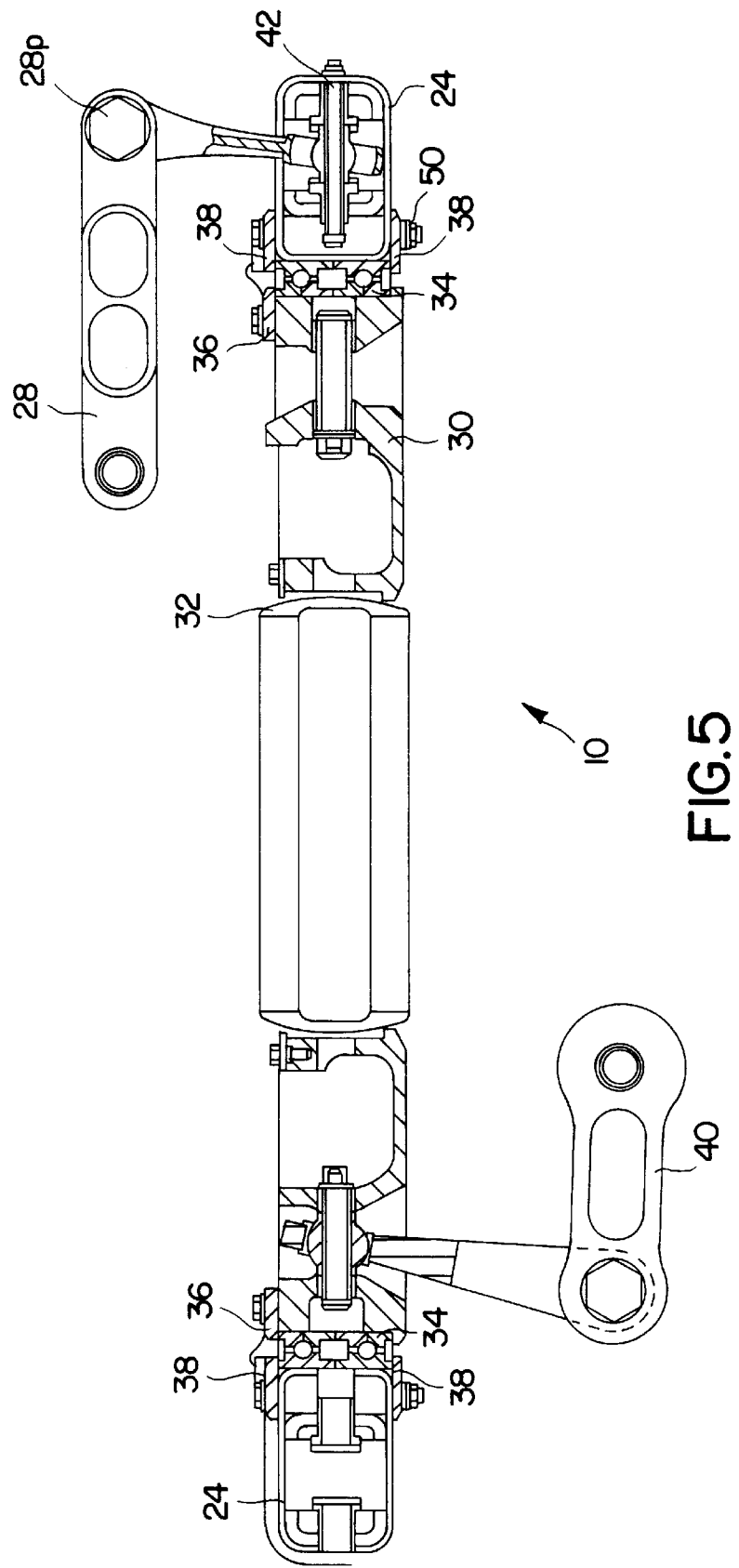
FIG. 5 is a cross-sectional side view of a swashplate assembly according to the present invention.

Two rotating scissors 28 are shown mounted on diametrically opposed sides of the rotating swashplate 24. The scissors 28 positions the rotating swashplate azimuthally relative to the rotor blades 14. The rotating scissors 28 include a pivot point $28_P$ about which upper and lower portions of the scissors can pivot. The pivoting of the upper and lower portions of the scissors permits vertical and angular displacement of the rotating swashplate 24 with respect to the rotor blades 14. As shown in FIG. 5, each rotating scissor 28 mounts to the rotating swashplate 24 through an aperture 26 formed in the swashplate 24. While two rotating scissors 28 are shown in FIG. 4, any number of scissor linkages may be used. The rotating scissors 28 are conventional in the art and, hence, no further discussion in required.

FIG. 5 illustrates a cross-sectional view of the swashplate assembly 10. As discussed above, the swashplate assembly 10 includes the rotating swashplate 24 and a stationary swashplate 30. The stationary swashplate 30 is disposed about a ball joint 32. The interconnection between the stationary swashplate 30 and the ball joint 32 is designed to allow angular motion of the stationary swashplate 30 with respect to the ball joint 32. The ball joint 32 is slidingly mounted on the rotor mast (not shown in FIG. 5) so as to permit the entire swashplate assembly 10 to move vertically.

The stationary swashplate 30 is conventional in the art and, therefore, a detailed discussion is not needed. A duplex or roller bearing 34 is located between the stationary swashplate 30 and the rotating swashplate 24. The bearing 34 permits low friction rotational motion between the two swashplate components. In the preferred embodiment, a retaining flange 36 is bolted to the stationary swashplate 30 to prevent the bearing 34 from sliding off of the stationary swashplate 30. Similarly, upper and lower retaining flanges 38 are bolted to the rotating swashplate 24 and function to retain the bearing 34 between the stationary swashplate 30 and the rotating swashplate 24.

Conventional stationary scissors 40 are preferably attached to the stationary swashplate 34 at one or more locations. The stationary scissors 40 prevent the stationary swashplate 34 from rotating. Stationary scissors 40 are well known in the art.

As discussed above, the rotating scissors 28 are attached to the rotating swashplate 24. The attachment is provided by means of a bolt 42 which extends through a portion of the rotating swashplate 24 and through a lug formed in the rotating scissors 28.

Figure 6:
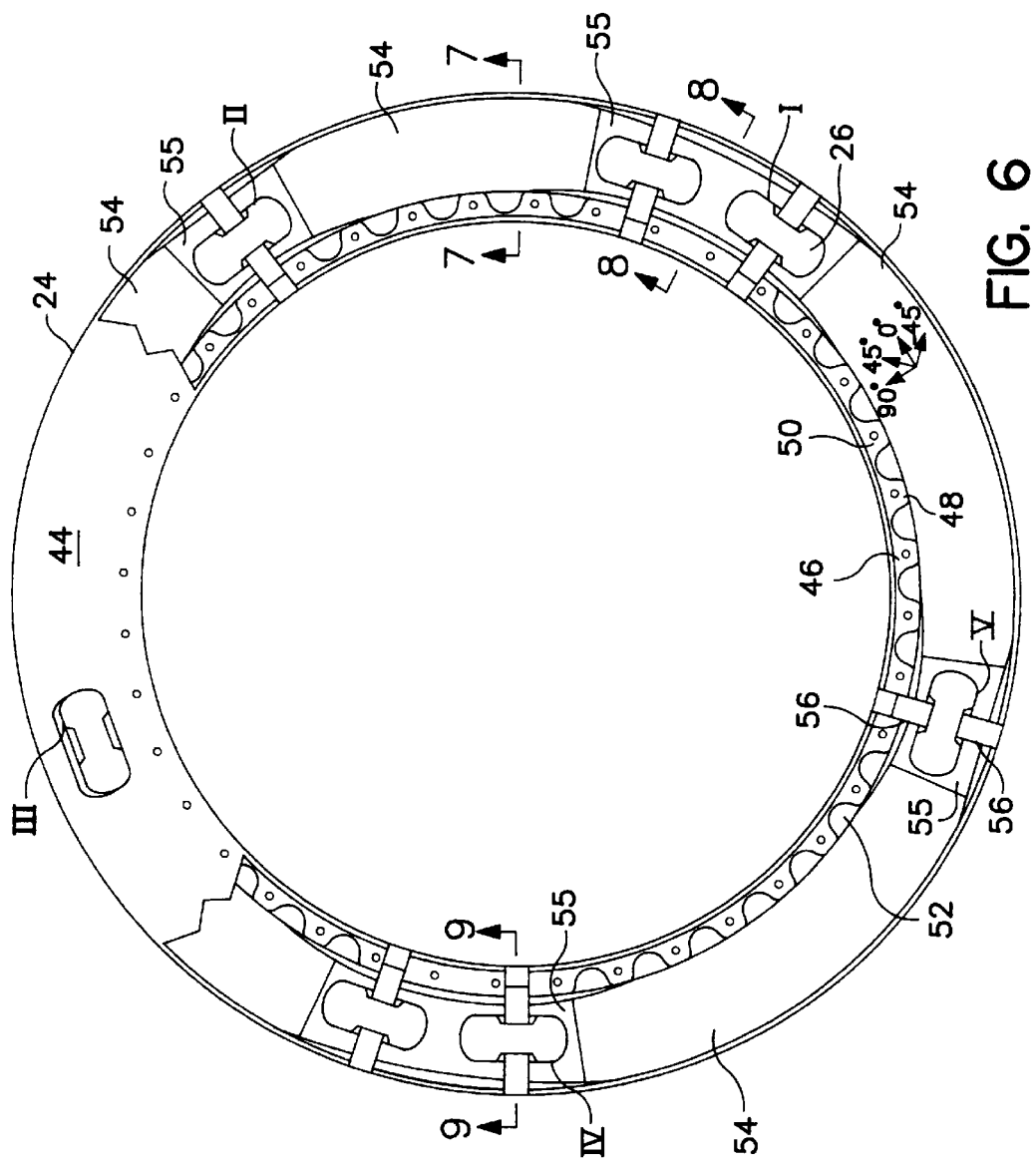
FIG. 6 is a partial cross-sectional top view of the composite rotating swashplate according to the present invention.

FIG. 6 is a more detailed top view of the rotating swashplate 24 illustrating its external and internal features. The rotating swashplate includes a composite outer ring or outer layer 44 which completely surrounds the toroidal surface of the swashplate. Only a portion of the outer layer 44 is illustrated in the figure in order to show the internal components of the swashplate 24. The outer layer 44 is preferably formed from a tri-axial (quasi-isotropic) braid of graphite fibers embedded in a resin matrix binder. That is, the braid includes fibers extending in approximately the 0° and ±45° directions. Additionally, a 90° ply of graphite fibers is wrapped around the braid to produce a quasi-isotropic laminate (0°, ±45°, and 90°). It should be noted that the this angular orientation is utilized for simplicity purposes. In actuality, since the rotating swashplate is in the shape of a toroidal or tubular ring, the 0° direction of the outer layer 44 extends circumferentially around the swashplate 24, and the 90° direction is in the radial direction of the toroid. Variations in these angular orientations are acceptable although the efficiency of the overall design may be effected. Regardless of the ply orientation chosen, it is preferable that the overall orientation be a quasi-isotropic lay-up. For example, the fibers that extend in the ±45 degree direction can readily extend anywhere between 30° and 60° without detracting significantly from the structural capabilities of the swashplate design. In order to accommodate rotor loads, the outer layer 44 preferably has a nominal thickness of about 3 mm. The resin is preferably a toughened epoxy resin that is typically utilized in a resin transfer molding process. For the normal conditions under which the swashplate is to be operating, any standard toughened epoxy would be suitable, such as PR500 resin sold by Minnesota Mining and Manufacturing Co., St. Paul, Minn. (3M), or IM7 or 8552 resins sold by Hercules Aerospace Co., Magna, Utah (Hercules). The preferred cured graphite/resin composite structure should contain about 60% fibers by volume. An acceptable range of fiber volume is between about 55% and 65% so as to provide the requisite mechanical properties. FIG. 10 shows the ply lay-up table for an exemplary embodiment of the rotating swashplate. The plies that constitute the outer layer are identified by ply numbers 19–28. The widths of each ply is listed under the column with the heading "Perim". The thickness of each ply is listed under the column with the heading "THK". Graphite plies typically have a tensile strength of about 500,00 psi to about 700,00 psi.

It also may be desirable to form an external layer over the outer layer 44 on the rotating swashplate 24. Preferably the external layer includes one ply of braided ±45 degree fiberglass with a thickness of 0.015 inches. The fiberglass braid provides the surface of the structure with added durability. The embodiment of the invention exemplified by FIG. 10 does not include an external layer of fiberglass.

A preform support ring 46 is preferably located adjacent the inner edge of the rotating swashplate 24. The support ring 46 is preferably made as a precure from sheet molding compound, such as a mixture of chopped graphite fibers in an epoxy resin matrix (e.g., PR500 resin) and is machined into a scalloped configuration as shown with spaced projections 48 radially extending around the periphery of the rotating swashplate 24 below the outer layer 44. The machining of scallops into the ring is intended to reduce the overall weight of the structure. Alternately, the support ring 46 can have a constant cross-section if weight is not a key concern. The projections 48 have holes formed therethrough for receiving bolts 50 that attach the upper and lower retaining flanges 38 as shown in FIG. 5. Any mid-modulus chopped graphite fiber would be suitable, such as those sold by Fiberite Manufacturing. The support ring 46 functions to react the preload from the bolts 50 which attach the duplex bearing retainer flanges 38.

One or more inserts or spacers 52 are preferably located adjacent to the outer periphery of the support ring 46. The spacers 52 are each molded or otherwise configured into a shape the defines at least a portion of a ring. The spacer 52 can made from a single piece of continuous foam or, alternately and more preferably, from several smaller foam ring portions that fit between the projections 48. The spacer 52 is configured to mate with the outer periphery of the support ring 46. The combination of the support ring 46 and the spacer 52 define a tubular ring as shown in FIG. 6. One function of the spacer 52 is to act as a mandrel for ply placement during manufacturing of the rotating swashplate. The spacer 52 may also provide additional stiffness to the structure. If the additional stiffness is needed, the spacer 52 can be made from a moldable structural foam. Any closed cell structure foam which is lightweight and easily machinable would be suitable, such as Rohacell® foam. Rohacell® foam is a trademark of Rohm Gmbh. Rohacell® foam is manufactured by Rohm Gmbh, Darmstadt, Germany and distributed in the United States by Richmond Aircraft Products, Norwalk, Calif. Alternately, if the structural stiffness of the foam is not needed after manufacturing, then it is preferable to make the spacer 52 from a foam which melts at an elevated temperature so that the foam will melt during the curing process. Preferably the foam has a melting temperature of about 250° Fahrenheit, such as eutectic metal alloy manufactured by Coretech Associates Incorporated, Providence, R.I.

Located radially outboard from the spacer 52 are core members 54. The core members 54 are spaced circumferentially about the rotating swashplate 24. The core members 54 are also preferably made from a foam material, such as Rohacell® foam with a density of about 96.1 kilograms per cubic meter. The core members 54 are preferably machined to define at least a portion or sector of a tubular ring. Alternately, the core members 54 may be formed as one continuous ring. As with the spacer 52, the core members 54 act as a mandrel during ply placement for accurately positioning. Once the laid-up structure is placed in a suitable molding apparatus (such as a resin transfer mold) and curing has begun, the core members 54 can be designed to melt away when a prescribed temperature is reached. If it is desirable to melt the core members 54 away during manufacturing, the core members 54 are preferably made from eutectic metal alloy or similar type material.

As discussed above, control rods preferably attach to the rotating swashplate at five attachment points. These are indicated in the FIG. 6 by numerals I through V. The core members 54 preferably terminate on either side of the attachment point. In place of the core members 54 at these locations is a mounting block 55. The mounting block 55 is preferably made from sheet molding compound, such as a mixture of chopped graphite fibers in an epoxy matrix. At each attachment point, a slotted aperture 26 for receiving a lug end of the control rod is preferably machined out of the mounting block 55. Alternately, the mounting block 55 can be formed (e.g., molded) with the slotted aperture 26 already in it. A mounting bolt or expandable pin (not shown) extends through at least a portion of the rotating swashplate 24 and through the lug in the control rod. The bolt or pin is preferably inserted into bushings 56 bonded into the rotating swashplate. The bushings 56 can be metallic or composite depending on weight and strength considerations. It is also contemplated that the core members 54 may be a continuous ring with holes cut through it at the attachment points for mounting precured mounting blocks 55.

Figure 7:
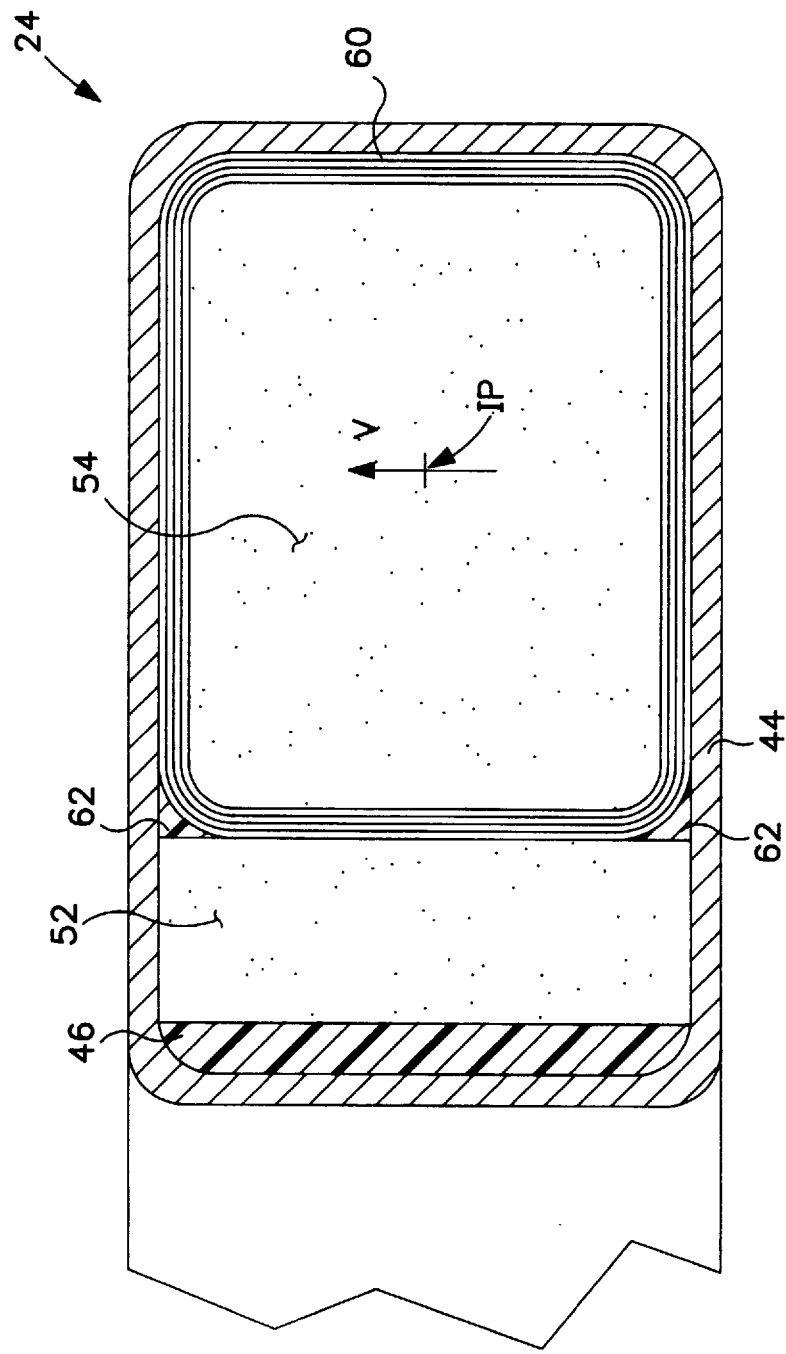
FIG. 7 is a cross-sectional view of the rotating swashplate taken along lines 7—7 in FIG. 6.

FIG. 7 is a cross-sectional view taken along lines 7—7 in FIG. 6 and illustrates the cross-section of the rotating swashplate at a location distant from the control rod attachment points. As discussed above, the outer layer 44 of the rotating swashplate is preferably formed as a tubular ring of braided graphite fibers in a resin matrix binder. The support ring 46 is shown in cross-section as it appears between projections 48. The support ring 46 defines an inner surface of the rotating swashplate 24 against which the braided graphite fibers of the outer layer 44 are wound. The spacer 52 is shown positioned adjacent to and radially outboard from the support ring 46.

The core member 54 is located radially adjacent to the spacer 52. Separating the core member 54 from the spacer 52 is a wall of a tubular secondary ring 60. The secondary tubular ring 60 completely surrounds the core member 54 so as to form an enclosed cell. The secondary tubular ring 60 is located within the outer layer 44 forming a two cell structure. A two cell ring structure provides an efficient swashplate configuration with a high degree of stiffness for reacting the rotor loads. The primary loads imposed on a rotating swashplate are control rod loads (generally identified in FIG. 7 by the vertical arrow "V") which act in the vertical direction, and axial or in-plane loads imparted by the rotating scissor (acting in-plane along the circumferential axis identified as "IP"). The configuration of the rotating swashplate 24 as a two cell structure provides two shear webs (the inboard walls of the secondary tubular ring 60 and the outer layer 44) for reacting the applied loads and transferring the loads to the stationary swashplate 30. The tubular shape of the cells also provides a very efficient structure for reacting any applied torsional loads.

The two cell structure of the rotating swashplate 24 also acts as a redundant load path for the swashplate. For example, in the event that a ballistic impact causes failure of one of the cells, the remaining cell maintains the structural integrity of swashplate in the damaged area.

In one preferred embodiment, the secondary tubular ring 60 is formed from a continuous braid of graphite fibers in a resin matrix binder. There are preferably four layers of approximately ±45 degree fibers. The resin is preferably a toughened epoxy resin, such as PR500 resin sold by 3M or IM7 resin sold by Hercules. The preferred cured graphite/resin composite structure should contain about 60% fibers by volume. An acceptable range of fiber volume is between about 55% and 65% so as to provide the requisite mechanical properties. This results in an overall thickness of about 1.6 mm. FIG. 10 shows a ply lay-up table for an exemplary embodiment of the invention. The plies that make up the secondary tubular ring 60 are identified by ply numbers 1, 6, 13 and 18.

Filler material 62 is located in the voids between the secondary tubular ring 60 and the spacer 52 in order to provide a smooth interface between the two. Preferably the filler material is chopper graphite in a resin matrix binder, such as PR500 sold by 3M. A chopped graphite fiber structure provides high stiffness with low weight. Any mid-modulus chopped graphite fiber would be suitable, such as those sold by Fiberite Manufacturing. The stiffness provided by the filler material 62 assists in load transfer through the rotating swashplate 24.

Figure 8:
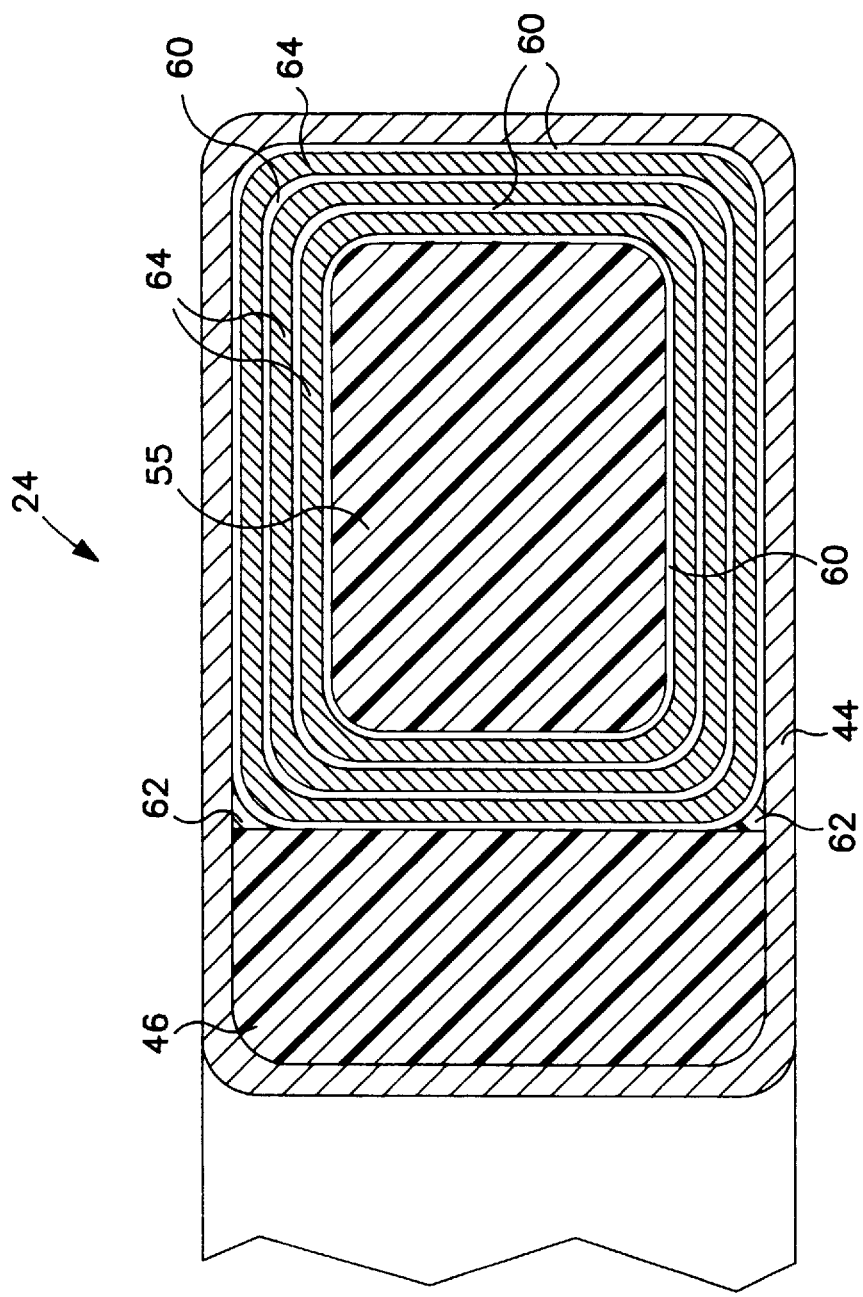
FIG. 8 is a cross-sectional view of the rotating swashplate taken along lines 8—8 in FIG. 6.

Referring now to FIG. 8, a cross-section of the rotating swashplate 24 is shown adjacent to one of the attachment points for the control rods. At this location, the rotating swashplate 24 includes the outer layer 44 surrounding the secondary tubular ring 60. The support ring 46 is located adjacent to the secondary tubular ring 60. The filler material 62 is located between the support ring 46 and the secondary tubular ring 60. In order to accommodate the high loads in the vicinity of the attachment points, additional strength is provided by the placement of ply packs 64 between each of the layers of plies that forms the secondary tubular ring 60. More specifically, a pack of approximately 0°, ±45° and 90° (quasi-isotropic) plies is placed between each braided layer of graphite fiber plies in the secondary tubular ring 60. In the preferred embodiment disclosed above, the secondary tubular ring 60 has four layers of graphite plies. Accordingly, located between each layer is a ply pack of tri-axial plies. The ply packs 64 preferably include graphite fibers in a resin matrix binder, such as PR500 made by 3M or IM7 manufactured by Hercules, and have a nominal thickness of about 1.8 mm. The plies in each pack 64 terminate in steps on either circumferential side of the slotted aperture 26. That is, the ply packs 64 taper down in thickness circumferentially on either side of the aperture 26. In the case where there are two apertures adjacent to one another (e.g., adjacent scissor and control rod attachment points), the ply packs 64 are preferably continuous between the two apertures as shown at attachment point I in FIG. 6.

The width of each ply pack 64 is defined as the distance the ply pack 64 extends circumferentially around the cross-section of the secondary tubular ring 60. As shown in FIG. 8, each ply pack 64 extends completely around the circumference of the cross-section of the secondary tubular ring 60. The juncture or butt between the ends of each ply pack 64 in a layer is preferably offset from the juncture between the ply pack 64 in the adjacent layer by 90 degrees.

A preferred orientation and thickness of the individual plies in each ply pack are shown in the ply lay-up table shown in FIG. 11 which depicts the ply lay-up at the lug attachment points. The ply packs are identified by ply numbers 2–5, 7–12 and 4–17. In order to minimize out-of-plane loading and the development of micro-cracks, it is preferable that the plies taper down at the ends of the ply packs.

Figure 9:
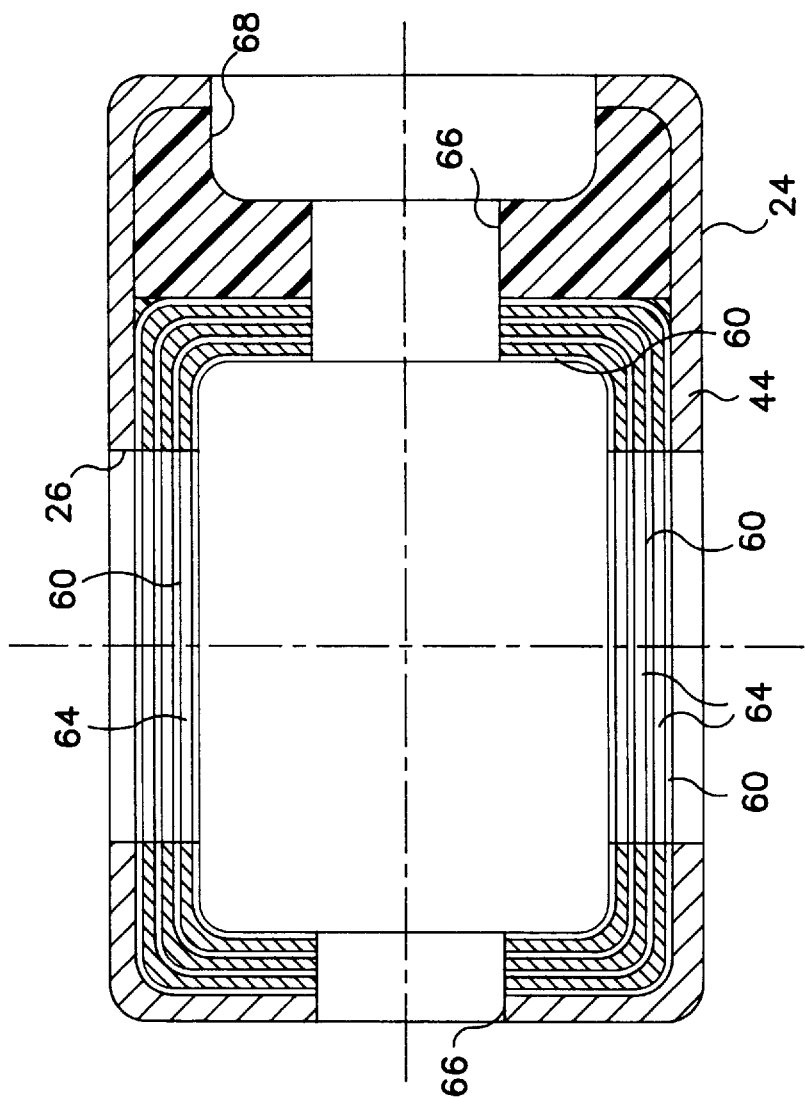
FIG. 9 is a cross-sectional view of the rotating swashplate taken along lines 9—9 in FIG. 6.

FIG. 9 is a cross-section of the rotating swashplate 24 taken at a control rod attachment point. The materials and ply lay-ups in this cross-section of the rotating swashplate are substantially the same as in the cross-section illustrated in FIGS. 8 and 11. The apertures 26 formed in the rotating swashplate 24 for receiving the rotating scissors and control rods extend through the secondary tubular ring 60. Holes 66 are formed through the inner and outer walls of the secondary tubular ring 60 and the outer layer 44 for receiving a mounting bolt or pin. The mounting bolt or pin attaches the control rod or rotating scissor to the rotating swashplate 24. A counterbore 68 may be formed on one side of the rotating swashplate 24 to recess the head of the mounting bolt or expandable pin.

The preferred embodiment of the rotating swashplate 24 may be made as follows. Foam material is cut and machined to the desired shapes to form the spacer 52 and the core members 54. The support ring 46 is made in a conventional molding process and machined to the specified shape. Preferably the support ring 46 is made in an resin transfer molding or injection molding process.

The core members 54 and mounting blocks 55 are arranged in a circular pattern in a composite tri-axial fiber braider. A suitable tri-axial braider is available from Fiber Innovations, Inc. of Norwood, Mass or Drexel University, Philadelphia, Pa. A first layer of braided graphite fibers for the secondary tubular ring 60 is formed around the core members 54. A first layer of ply packs 64 is then placed over the first layer of braided graphite fiber in the areas where the attachment points will eventually be located. As discussed above, two or more ply packs 64 are preferably utilized to form each layer of ply packs 64. The ply packs 64 in a layer are positioned adjacent to one another around the circumference of the cross-section of the secondary tubular ring 60. After the first layer of ply packs 64 is complete, a second layer of braided graphite fibers is formed around the ply packs 64. This procedure is repeated until there are four layers of braided graphite material defining the secondary tubular ring 60.

One or more spacers 52 are placed adjacent to the preformed ring 46. The support ring 46 and spacers 52 are then positioned adjacent to the inner diameter of the secondary tubular ring 60. Filler material 62 is added in the voids between the spacers 52/support ring 46 and the secondary tubular ring 60. A tri-axial braider is then utilized to place the four 0°/45° plies of graphite fibers that form the outer layer 44. During braiding, a ply of 90° graphite is placed between each braided 0/±45° ply.

The swashplate is then placed into a resin transfer mold. Resin is injected under pressure into the mold to mix with the graphite fibers. The assembly is cured and then removed from the mold. During injection and initial curing, the support ring 46, the spacer 52, the filler material 62, the core members 54 and the mounting blocks 55 function as mandrels to maintain the smooth and efficient tubular shape of the outer layer 44 and the secondary tubular ring 60. Post-curing operations are performed after curing, such as cutting the slotted apertures (if not formed prior to curing) and drilling holes in the swashplate.

A final outer ply of ±45 degree fiberglass material may be added before or after curing. Preferably, the fiberglass ply is a tri-axial braid of 0°/±45° fabric which is placed around the outer layer 44 before resin transfer molding the part.

Additionally, as stated above, the foam materials (spacer 52 and core members 54) may be designed to decompose (melt) at the end of the curing process. This would lessen the final weight of the swashplate 24.

The above discussion describes in detail the preferred embodiment of the invention which is suitable for reacting loads likely to be encountered in a five bladed rotor system, such as the rotor system on the RAH-66A Comanche aircraft. Different helicopter configurations would, of course, result in different materials and swashplate configurations. A person skilled in the art of helicopter rotor system design would readily appreciate the modifications that can be made to the disclosed system.

Figure 12:
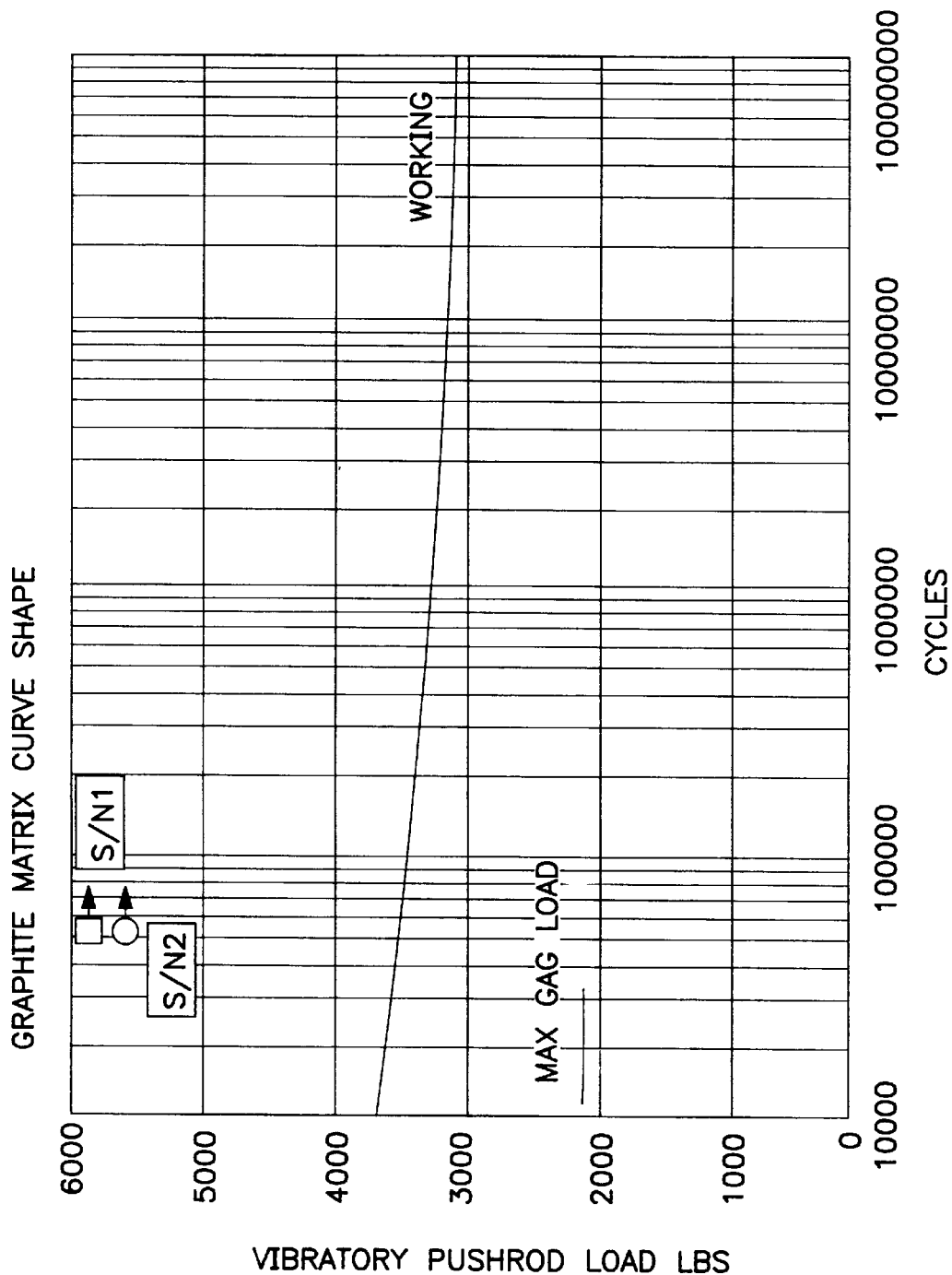
FIG. 12 is a graphical illustration of results from a test of a risk reduction specimen.

A risk reduction specimen of the swashplate according to the present invention was manufactured and fatigue and static tested. FIG. 12 depicts the results of the tests. As shown, the projected lifetime working strength of the test specimen was greater than the maximum vibratory pushrod load ("GAG") expected. Static strength showed that the braided specimen had the same strength at the lug attachment point as a flat-plate hand laid-up composite swashplate.

In the risk reduction specimen, the per ply fiber volume was about 57%. The tri-axial braid was 144 ends of 1110 Yield tow and 72 ends of 833 Yield tow set up as 36 double spools and 36 single spools alternating. Each tri-axial braid layer included 32% zero degree fibers, 34% −45 degree fibers and 34% +45 degree fibers.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

We claim:

1. A composite rotating swashplate for a helicopter rotor system, the helicopter rotor system including a plurality of rotor blades with associated control rods, the control rods adapted to control the pitch of the rotor blades, the rotating swashplate comprising:

a braided tubular outer ring;

a braided secondary tubular ring located within the outer ring, the secondary tubular ring having an inboard wall;

a support ring located within the outer ring and external to the inboard wall of the secondary tubular ring; and a plurality of apertures formed through the outer ring and secondary tubular ring, the apertures adapted to receive a terminal end of the control rods.

2. A composite rotating swashplate according to claim 1 wherein the tubular outer ring comprises a plurality of plies of tri-axial braided graphite fibers in a resin matrix.

3. A composite rotating swashplate according to claim 2 wherein the tubular outer ring further comprises at least one unidirectional ply of graphite fibers between each ply of tri-axial braided graphite fibers.

4. A composite rotating swashplate according to claim 1 further comprising a braid of fiberglass material overwrapping the outer tubular ring.

5. A composite rotating swashplate according to claim 1 wherein the secondary tubular ring includes at least one ply of braided graphite fiber in a resin matrix.

6. A composite rotating swashplate according to claim 5 wherein there are a four plies of braided graphite fiber.

7. A composite rotating swashplate according to claim 1 wherein the support ring is made from chopped graphite fibers in an epoxy resin matrix.

8. A composite rotating swashplate according to claim 1 wherein the support ring has a plurality of projections extending radially outwardly from the periphery of the support ring.

9. A composite rotating swashplate according to claim 1 further comprising a core member located within at least a portion of the secondary tubular ring.

10. A composite rotating swashplate according to claim 9 wherein the core member is located between at least two of the apertures and is made of foam material.

11. A composite rotating swashplate according to claim 1 further comprising a plurality of mounting blocks located within the secondary tubular member, and wherein each aperture is formed through at least a portion of ont of the mounting blocks.

12. A composite rotating swashplate according to claim 11 wherein the mounting blocks are made from chopped fibers in an epoxy resin matrix.

13. A composite rotating swashplate according to claim 1 further comprising at least one spacer located within the outer tubular ring and between the support ring and the secondary tubular ring.

14. A composite rotating swashplate according to claim 13 wherein at least a portion of the spacer is located between radial projections of the support ring and is made from foam material.

15. A composite rotating swashplate according to claim 8 further comprising a filler disposed between a portion of the support ring, the secondary tubular ring, and the outer tubular ring, the filler including chopped fibers in an epoxy resin matrix.

16. A composite rotating swashplate for a helicopter rotor system, the helicopter rotor system including a plurality of rotor blades mounted to a rotor shaft, each rotor blade having a control rod adapted to control the pitch of the blade, the helicopter rotor system also including at least one rotating scissor in rotating engagement with the rotor shaft, the swashplate comprising:

a first tubular outer ring made from fiber reinforced resin matrix composite material;

a second tubular ring formed within the first tubular ring and having an inboard wall made from fiber reinforced resin matrix composite material;

a support ring located within the first tubular ring and adjacent to at least a portion of the inboard wall of the second tubular ring;

a plurality of apertures formed through the first and second tubular rings the apertures adapted to receive a lug end of a control rod; and at least one aperture formed through the first and second tubular rings and adapted to receive a lug end of a rotating scissor.

17. A composite rotating swashplate according to claim 16 wherein the fibers in the first and second tubular rings are braided.

18. A composite rotating swashplate according to claim 16 wherein the fiber reinforced resin matrix composite material in at least a portion of the first tubular ring includes an interweave of a plurality of tri-axial braided graphite plies and unidirectional graphite plies, the tri-axial braided plies having a fiber orientation of approximately 0° and ±45°, the unidirectional plies having a fiber orientation of approximately 90°, and wherein the resin is an epoxy resin.

19. A composite rotating swashplate according to claim 16 wherein the fiber reinforced resin matrix composite material in at least a portion of the second tubular ring includes a plurality of braided graphite plies having a fiber orientation of approximately ±45°, and wherein the resin is an epoxy resin.

20. A composite rotating swashplate according to claim 19 wherein the fiber reinforced resin matrix composite material in the second tubular ring further includes at least at location at least one ply pack of fibers in a resin matrix, the ply pack including an interweave of a plurality of first and second plies, the first plies having a fiber orientation of approximately 0° and 90°, the second ply pack having a fiber orientation of approximately ±45°, and the resin being an epoxy resin.

21. A composite rotating swashplate according to claim 20 wherein there are a plurality of ply packs, at least one ply pack being disposed between adjacent braids of graphite plies.

22. A composite rotating swashplate according to claim 16 further comprising an outer layer of braided ±45° fiberglass reinforced resin matrix composite material.

* * * * *